(12) United States Patent
Burke

(10) Patent No.: US 12,479,302 B2
(45) Date of Patent: Nov. 25, 2025

(54) CONTROL SYSTEM FOR A VEHICLE

(71) Applicant: PROTEAN ELECTRIC LIMITED, Farnham (GB)

(72) Inventor: Richard Burke, Farnham (GB)

(73) Assignee: PROTEAN ELECTRIC LIMITED, Farnham (GB)

( * ) Notice: Subject to any disclaimer, the term of this patent is extended or adjusted under 35 U.S.C. 154(b) by 0 days.

(21) Appl. No.: 18/119,642

(22) Filed: Mar. 9, 2023

(65) Prior Publication Data

US 2023/0278429 A1 Sep. 7, 2023

Related U.S. Application Data

(63) Continuation of application No. 16/631,490, filed as application No. PCT/IB2018/055255 on Jul. 16, 2018, now abandoned.

(30) Foreign Application Priority Data

Jul. 17, 2017 (GB) ..................................... 1711413

(51) Int. Cl.
  *B60L 3/00* (2019.01)
  *B60K 7/00* (2006.01)
  (Continued)

(52) U.S. Cl.
  CPC .......... *B60L 3/0084* (2013.01); *B60K 7/0007* (2013.01); *B60L 3/0061* (2013.01);
  (Continued)

(58) Field of Classification Search
  CPC .................................................. G06N 20/00
  (Continued)

(56) References Cited

U.S. PATENT DOCUMENTS 6,322,318 B1 * 11/2001 Radosevich ............ F04C 23/00
  415/119
2013/0144479 A1 * 6/2013 Ito ........................ B60L 3/0076
  701/22

(Continued)

FOREIGN PATENT DOCUMENTS

DE  102014209887 A1 * 11/2015 ............... B60L 15/02
WO  WO-2017051308 A1 * 3/2017 ............... B60K 1/02

OTHER PUBLICATIONS

Translation DE 10 2014 2 9 887 (Year: 2015).*

*Primary Examiner* — Jacob S. Scott
*Assistant Examiner* — Michael E Butler
(74) *Attorney, Agent, or Firm* — Nolte Lackenbach Siegel

(57) ABSTRACT

A control system for a vehicle having a first wheel arranged to be driven by a first electric motor and a second wheel arranged to be driven by a second electric motor, wherein the first wheel and the second wheel are transversely located on the vehicle relative to each other, the control system comprising a first controller associated with the first electric motor and a second controller associated with the second electric motor, wherein the first controller includes means for estimating a first power value for the power applied to the second wheel by the second electric motor when the second electric motor is placed in a first motor configuration and means for estimating a second power value for the power applied to the second wheel by the second electric motor when the second electric motor is placed in a second motor configuration, wherein upon the occurrence of a predetermined condition the first controller is arranged to determine a first power differential between the power being applied to the first wheel by the first electric motor and the first power value and a second power differential between the power being applied to the first wheel by the first electric motor and the second power value, wherein if the first (Continued)

controller determines that if either the first power differential or the second power differential is greater than a predetermined value the first controller is arranged to adjust the torque generated by the first electric motor or if both the first power differential and the second power differential are less than a predetermined value the first controller is arranged to maintain the torque generated by the first electric motor.

10 Claims, 9 Drawing Sheets

(51) Int. Cl.
*B60L 3/04* (2006.01)
*B60L 3/10* (2006.01)
*B60L 15/20* (2006.01)

(52) U.S. Cl.
CPC ............... *B60L 3/0069* (2013.01); *B60L 3/04* (2013.01); *B60L 3/102* (2013.01); *B60L 15/2036* (2013.01); *B60L 2240/421* (2013.01); *B60L 2240/423* (2013.01); *B60L 2240/429* (2013.01); *B60L 2240/463* (2013.01); *B60Q 2300/134* (2013.01)

(58) Field of Classification Search
USPC .......................................................... 701/22
See application file for complete search history.

(56) References Cited

U.S. PATENT DOCUMENTS

2019/0165704 A1* 5/2019 Martin ...................... H02P 3/22
2019/0363664 A1* 11/2019 Nakamura .............. H02P 27/06

* cited by examiner

Drag Torque in Difference Modes at 320V

Drag Power in Different Modes at 320V

Disabled Motor Torque and Power
Uncertainty Against Speed

CONTROL SYSTEM FOR A VEHICLE

CROSS REFERENCE TO RELATED APPLICATION

This application is a continuation of co-pending U.S. patent application Ser. No. 16/631,490, filed Jan. 16, 2020, which is a U.S. National Stage Patent Application based on PCT No. PCT/IB2018/055255, filed Jul. 16, 2018, claiming priority to GB Application No. 1711413.3, filed on Jul. 17, 2017, the entire contents of which are hereby incorporated by reference as though fully set forth herein, the entire contents of which are hereby incorporated by reference as though fully set forth herein.

The present invention relates to a control system, in particular a control system for a vehicle.

With increased interest being placed in environmentally friendly vehicles there has, perhaps unsurprisingly, been a corresponding increase in interest in the use of electric vehicles.

Although most commercially available electric vehicles utilise a central electric motor that is used to drive two or more of the vehicles wheels, an alternative solution that is gaining increased popularity utilises in-wheel electric motors, where individual electric motors are used to drive the respective wheels of a vehicle, thereby allowing torque delivery to each wheel to be independently controlled. The fast response characteristics of an electric motor together with independent torque control to the wheels of a vehicle allow in-wheel electric motors to be used to improve vehicle stability complementing or replacing additional vehicle stability control mechanisms. For example, the independent torque control of in-wheel electric motors can be used to provide both traction control and vehicle dynamic control.

However, for vehicles having a plurality of wheels driven by their own independent drive source, if torque delivery to each road wheel is applied incorrectly any associated torque asymmetry may cause the hazard induced yaw.

Consequently, a vehicle having a drive system, in which torque is independently delivered to each wheel of the vehicle, preferably includes a monitoring system that monitors the torque being applied to each respective wheel, where the monitoring system takes corrective action should the torque asymmetry reach an unacceptable level.

If, however, the monitoring system fails to receive torque information associated with one of the wheels, to prevent the possibility of a hazard induced yaw the monitoring system will typically place the drive system in a safe state by disabling the whole drive system, thereby disabling the vehicle.

It is desirable to improve this situation.

In accordance with an aspect of the present invention there is provided a control system and method according to the accompanying claims.

For a vehicle configuration where transversely mounted wheels are independently driven by separate electric motors, the present invention as claimed provides the advantage of, upon loss of communication of one electric motor with another electric motor, allowing the vehicle to be powered by a single motor without exceeding yaw safety limits. A determination is made as to whether the power being generated by the electric motor, for which communication with has been lost, is below a threshold value. If a determination is made that the power generated by the other electric motor is below the threshold value the power generated by the electric motor that is no longer receiving communication from the other electric motor may maintain the torque generated by the electric motor, thereby allowing the vehicle to be powered by a single motor without exceeding yaw safety limits.

The present invention will now be described, by way of example, with reference to the accompanying drawings, in which.

Figure 1:
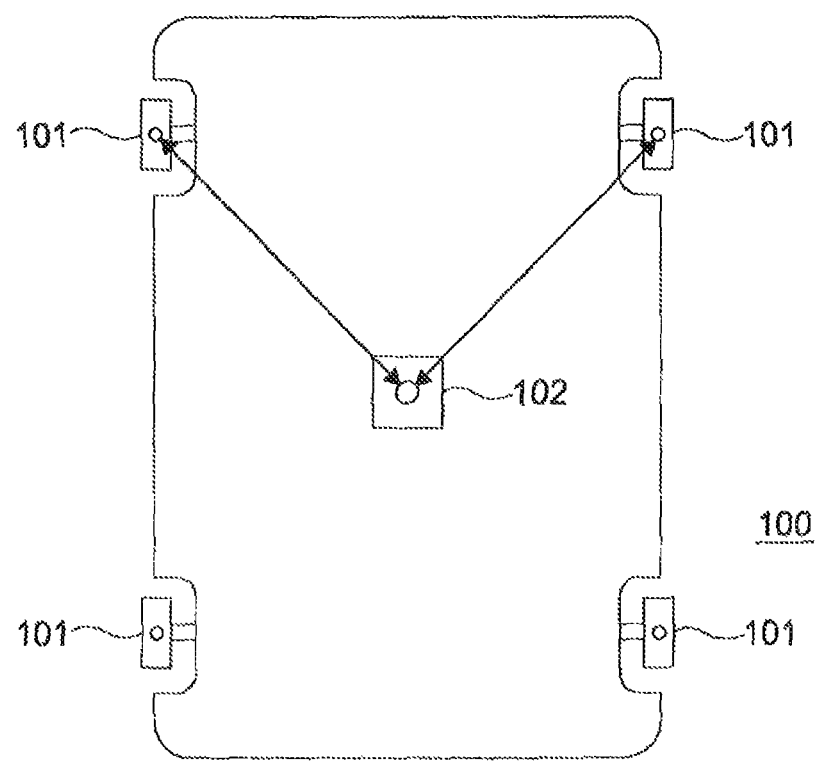
FIG. 1 illustrates a vehicle according to an embodiment of the present invention.

The embodiment of the invention described is for a control system for preventing, upon occurrence of a preconditioned condition such as loss of communication between two electric motors that are independently driving transversely mounted wheels on a vehicle, a hazard induced yaw condition. The control system is for a vehicle having a first wheel arranged to be driven by a first electric motor and a second wheel arranged to be driven by a second electric motor, wherein the first wheel and the second wheel are transversely located on the vehicle relative to each other. The control system includes a first controller associated with the first electric motor and a second controller associated with the second electric motor. Upon the first controller failing to receive power or torque information generated by the second electric motor the first controller estimates a first power value for the power applied to the second wheel by the second electric motor when the second electric motor is placed in a first motor configuration and estimates a second power value for the power applied to the second wheel by the second electric motor when the second electric motor is placed in a second motor configuration, thereby estimating possible power values for the power applied to the second wheel by the second electric motor for a plurality of different scenarios. Upon the first controller estimating the plurality of different possible power values which could be applied by the second electric motor to the second wheel the first controller is arranged to determine a first power differential between the power being applied to the first wheel by the first electric motor and the first estimated power value and a second power differential between the power being applied to the first wheel by the first electric motor and the second estimated power value. If the first controller determines that if either the first power differential or the second power differential is greater than a predetermined value the first controller is arranged to adjust the torque generated by the first electric motor to ensure that the maximum possible power differential would not result in yaw safety limits being exceeded. If the first controller determines that both the first power differential and the second power differential are less than a predetermined value the first controller is arranged to maintain the torque generated by the first electric motor.

For the purposes of the present embodiment the electric motors are for use in a wheel of a vehicle, however the electric motors may be located anywhere within the vehicle. The motors are of the type having a set of coils being part of a stator for attachment to a vehicle, radially surrounded by a rotor carrying a set of magnets for attachment to a wheel. In addition, some of the aspects of the invention are applicable to an arrangement having the rotor centrally mounted within radially surrounding coils. As would be appreciated by a person skilled in the art, the present invention is applicable for use with other types of electric motors or drive systems.

FIG. 1 illustrates a vehicle 100, for example a car or lorry, having four wheels 101, where two wheels are located in the vehicles forward position in a near side and off side position respectively, where the near side wheel is designated the first wheel and the off side wheel is designated the second wheel. Similarly, two additional wheels are located in the vehicles aft position in near side and off side positions respectively, as is typical for a conventional car configuration. However, as would be appreciated by a person skilled in the art, the vehicle may have any number of wheels.

Incorporated within each of the two front wheels 101 is an in-wheel electric motor, as described in detail below, where each in-wheel electric motor acts as a drive source for each respective wheel. However, although the current embodiment describes a vehicle having an in-wheel electric motor associated with each of the two front wheels 101, as would be appreciated by a person skilled in the art other in-wheel electric motor configurations may be adopted. For example, for a four wheeled vehicle all the wheels may have associated in-wheel motors or alternately only the rear two wheels may have associated in-wheel motors.

Coupled to each in-wheel electric motor is a central controller 102, where the function of the central controller 102 is described in detail below.

Figure 2:
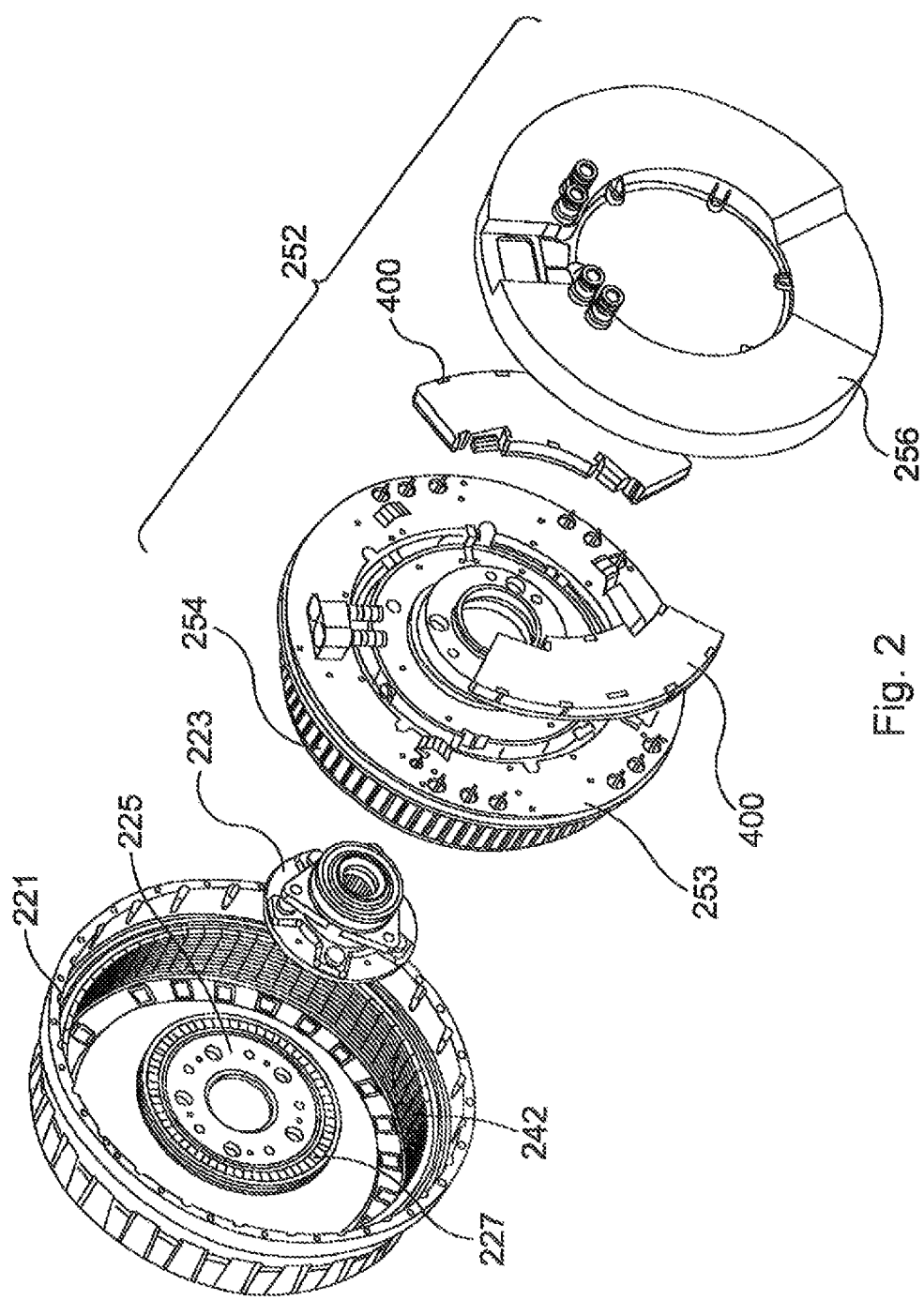
FIG. 2 illustrates an exploded view of an electric motor as used in an embodiment of the present invention.
Figure 3:
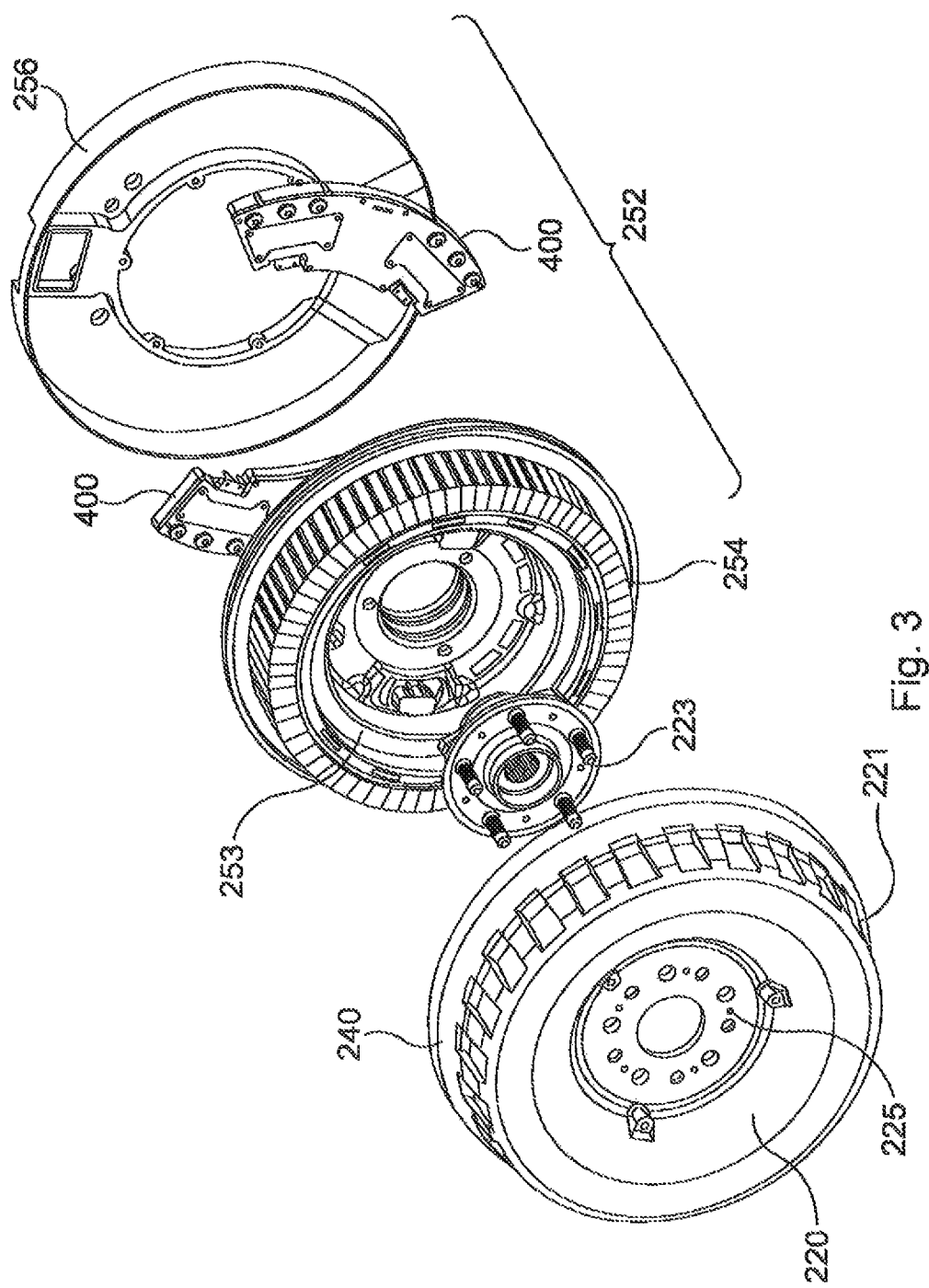
FIG. 3 illustrates an exploded view of the electric motor shown in FIG. 2 from an alternative angle.

For the purposes of the present embodiment, as illustrated in FIG. 2 and FIG. 3, the in-wheel electric motor includes a stator 252 comprising a heat sink 253, multiple coils 254, two control devices 400 mounted on the heat sink 253 on a rear portion of the stator for driving the coils, and an annular capacitor, otherwise known as a DC link capacitor, mounted on the stator within the inner radius of the control devices 400. The coils 254 are formed on stator tooth laminations to form coil windings. A stator cover 256 is mounted on the rear portion of the stator 252, enclosing the control devices 400 to form the stator 252, which may then be fixed to a vehicle and does not rotate relative to the vehicle during use.

Figure 4:
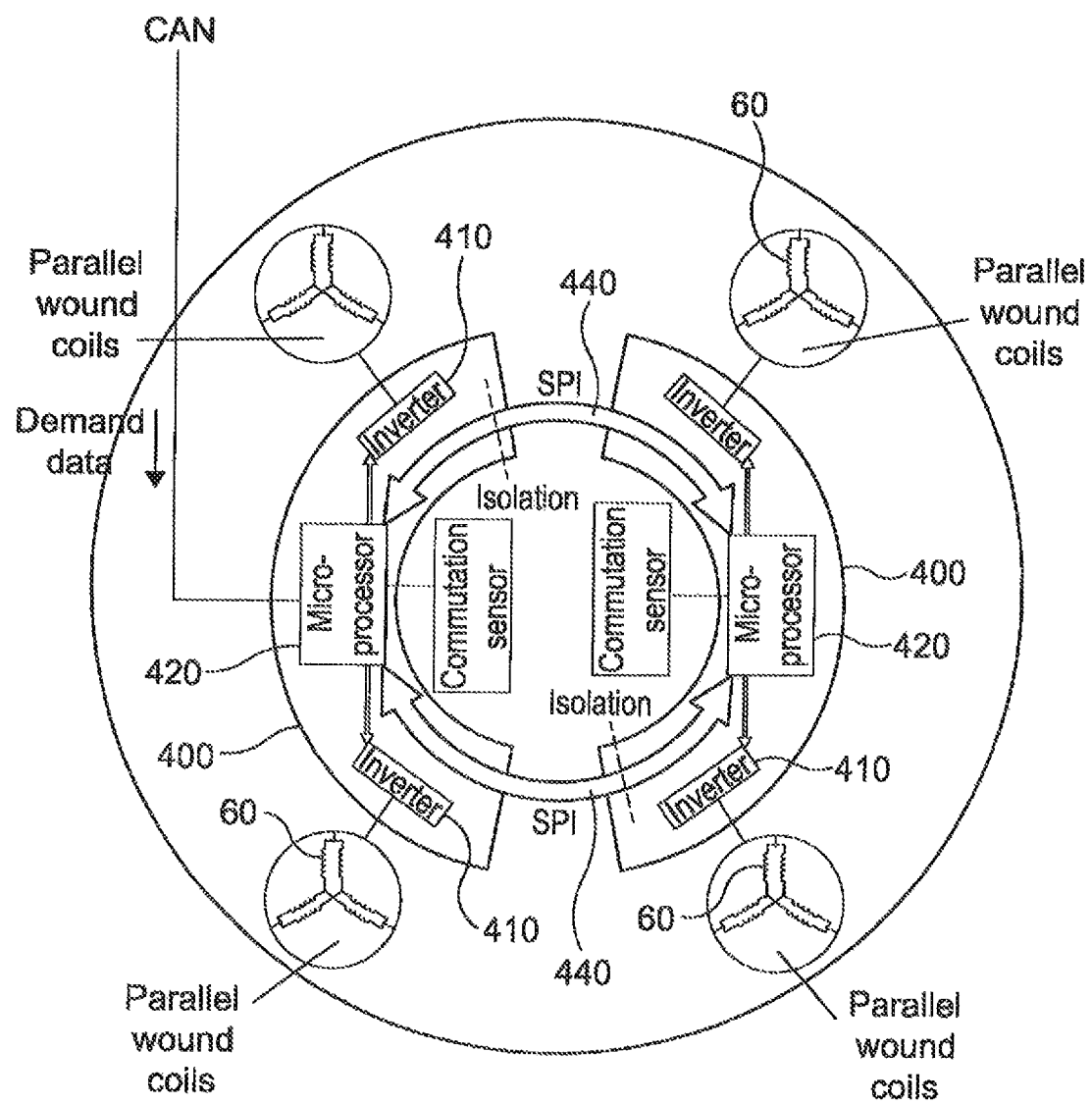
FIG. 4 illustrates an electric motor according to an embodiment of the present invention.

Each control device 400 includes two inverters 410 and control logic 420, which in the present embodiment includes a processor, for controlling the operation of the inverters 410, which is schematically represented in FIG. 4.

Although for the purposes of the present embodiment the in-wheel electric motor includes two control devices, where each control device includes control logic, in other words a controller, for controlling the operation of an inverter, any configuration of control logic and inverter combination may be used, including placing the control logic and/or inverters remote to the electric motor.

The annular capacitor is coupled across the inverters 410 and the electric motor's DC power source for reducing voltage ripple on the electric motor's power supply line, otherwise known as the DC busbar, and for reducing voltage overshoots during operation of the electric motor. For reduced inductance the capacitor is mounted adjacent to the control devices 400. Accordingly, current flow to the electric motor is via the DC busbar, where the electric motor acts as an electrical load to the DC power source with the DC power source's voltage being placed across the DC busbar. As described below, a current sensor is used to measure the DC busbar line current to the electric motor.

A rotor 240 comprises a front portion 220 and a. cylindrical portion 221 forming a cover, which substantially surrounds the stator 252. The rotor includes a plurality of permanent magnets 242 arranged around the inside of the cylindrical portion 221. For the purposes of the present embodiment 32 magnet pairs are mounted on the inside of the cylindrical portion 221. However, any number of magnet pairs may be used.

The magnets are in close proximity to the coil windings on the stator 252 so that magnetic fields generated by the coils interact with the magnets 242 arranged around the inside of the cylindrical portion 221 of the rotor 240 to cause the rotor 240 to rotate. As the permanent magnets 242 are utilized to generate a drive torque for driving the electric motor, the permanent magnets are typically called drive magnets.

The rotor 240 is attached to the stator 252 by a bearing block 223. The bearing block 223 can be a standard bearing block as would be used in a vehicle to which this motor assembly is to be fitted. The bearing block comprises two parts, a first part fixed to the stator and a second part fixed to the rotor. The bearing block is fixed to a central portion 253 of the wall of the stator 252 and also to a central portion 225 of the housing wall 220 of the rotor 240. The rotor 240 is thus rotationally fixed to the vehicle with which it is to be used via the bearing block 223 at the central portion 225 of the rotor 240. This has an advantage in that a wheel rim and tyre can then be fixed to the rotor 240 at the central portion 225 using the normal wheel bolts to fix the wheel rim to the central portion of the rotor and consequently firmly onto the rotatable side of the bearing block 223. The wheel bolts may be fitted through the central portion 225 of the rotor through into the bearing block itself. With both the rotor 240 and the wheel being mounted to the bearing block 223 there is a one to one correspondence between the angle of rotation of the rotor and the wheel.

FIG. 3 shows an exploded view of the same motor assembly illustrated in FIG. 2 from the opposite side. The rotor 240 comprises the outer rotor wall 220 and circumferential wall 221 within which magnets 242 are circumferentially arranged. As previously described, the stator 252 is connected to the rotor 240 via the bearing block at the central portions of the rotor and stator walls.

A V shaped seal is provided between the circumferential wall 221 of the rotor and the outer edge of the stator. The rotor also includes a set of magnets 227 for position sensing, otherwise known as commutation magnets, which in conjunction with sensors mounted on the stator allows for a rotor flux angle to be estimated. The rotor flux angle defines the positional relationship of the drive magnets to the coil windings. Alternatively, in place of a set of separate magnets the rotor may include a ring of magnetic material that has multiple poles that act as a set of separate magnets.

To allow the commutation magnets to be used to calculate a rotor flux angle, preferably each drive magnet has an associated commutation magnet, where the rotor flux angle is derived from the flux angle associated with the set of commutation magnets by calibrating the measured commutation magnet flux angle. To simplify the correlation between the commutation magnet flux angle and the rotor flux angle, preferably the set of commutation magnets has the same number of magnets or magnet pole pairs as the set of drive magnet pairs, where the commutation magnets and associated drive magnets are approximately radially aligned each with other. Accordingly, for the purposes of the present embodiment the set of commutation magnets has 32 magnet pairs, where each magnet pair is approximately radially aligned with a respective drive magnet pair.

A sensor, which in this embodiment is a Hall sensor, is mounted on the stator. The sensor is positioned so that as the rotor rotates each of the commutation magnets that form the commutation magnet ring respectively rotates past the sensor.

As the rotor rotates relative to the stator the commutation magnets correspondingly rotate past the sensor with the Hall sensor outputting an AC voltage signal, where the sensor outputs a complete voltage cycle of 360 electrical degrees for each magnet pair that passes the sensor, where the AC voltage signal output by the Hall sensor can be used for both rotor position detection and for determining rotor velocity (w).

For improved position detection, preferably the sensor includes an associated second sensor placed 90 electrical degrees displaced from the first sensor.

In the present embodiment the electric motor includes four coil sets with each coil set having three coil sub-sets that are coupled in a wye configuration to form a three phase sub-motor, resulting in the motor having four three phase sub-motors. The operation of the respective sub-motors is controlled via one of the two control devices 400, as described below. However, although the present embodiment describes an electric motor having four coil sets (i.e. four sub motors) the motor may equally have one or more coil sets with associated control devices. In a preferred embodiment the motor includes eight coil sets 60 with each coil set having three coil sub-sets that are coupled in a wye configuration to form a three phase sub-motor, resulting in the motor having eight three phase sub-motors. Similarly, each coil set may have any number of coil sub-sets, thereby allowing each sub-motor to have two or more phases.

FIG. 4 illustrates the connections between the respective coil sets 60 and the control devices 400, where a respective coil set 60 is connected to a respective three phase inverter 410 included on a control device 400 for controlling current flow within the respective coil sets. As is well known to a person skilled in the art, a three phase inverter contains six switches, where a three phase alternating voltage may be generated by the controlled operation of the six switches. However, the number of switches will depend upon the number of voltage phases to be applied to the respective sub motors, where the sub motors can be constructed to have any number of phases.

Figure 5:
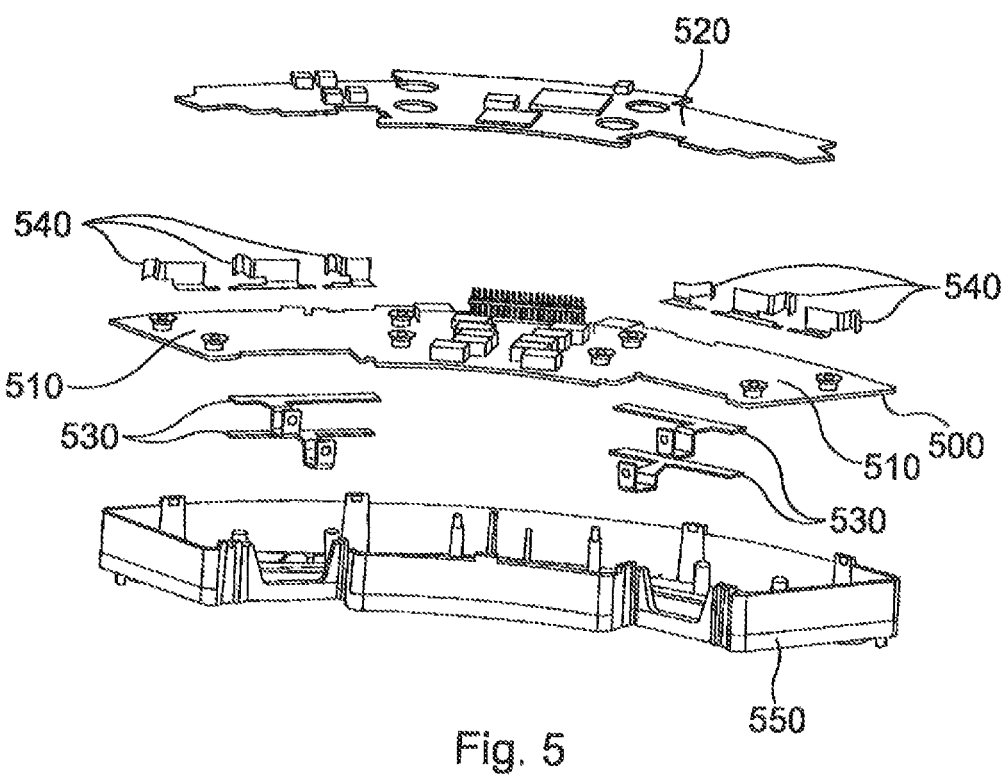
FIG. 5 illustrates an exploded view of a control device according to an embodiment of the present invention.

Preferably, the control devices 400 are of a modular construction. FIG. 5 illustrates an exploded view of a preferred embodiment, where each control device 400, otherwise known as a power module, includes a power printed circuit board 500 in which are mounted two power substrate assemblies 510, a control printed circuit board 520, four power source busbars 530 for connecting to a DC battery, and six phase winding busbars 540 for connecting to respective coil windings. Each of the control device components are mounted within a control device housing 550 with the four power source busbars 530 being mounted on an opposite side of the control device housing 550 to the phase winding busbars 540. As stated above, current flow to the electric motor, in other words the line current, is via the respective power source busbars, where the electric motor acts as an electrical load to the DC power source with the DC power source's voltage being placed across the respective power source busbars.

Each power substrate 510 is arranged to be mounted in a respective aperture formed in the power printed circuit board 500.

The power printed circuit board 500 includes a variety of components that include drivers for the inverter switches formed on the power substrate assemblies 510, where the drivers are typically used to convert control signals into a suitable form to turn the inverter switches on and off.

The control printed circuit board 520 includes a processor for controlling the operation of the inverter switches. Additionally, each control printed circuit board 520 includes an interface arrangement to allow communication between the respective control devices 400 via a communication bus with one control device 400 being arranged to communicate with a vehicle controller mounted external to the electric motor. The processor 420 on each control device 400 is arranged to handle communication over the interface arrangement. As stated above, the processors 420 on the respective control devices 400 are arranged to control the operation of the inverter switches mounted on the respective power substrates 520 within the control housing 550, thereby allowing each of the electric motor coil sets 60 to be supplied with a three phase voltage supply resulting in the respective coil sub-sets generating a rotating magnetic field. As stated above, although the present embodiment describes each coil set 60 as having three coil sub-sets the present invention is not limited by this and it would be appreciated that each coil set 60 may have one or more coil sub-sets.

Under the control of the respective processors 420, each three phase bridge inverter 410 is arranged to provide pulse width modulation PWM voltage control across the respective coil sub-sets, thereby generating a current flow in the respective coil sub-sets for providing a required torque by the respective sub-motors, where the current flow in the respective coil sub-sets is known as phase current.

PWM control works by using the motor inductance to average out an applied pulse voltage to drive the required current into the motor coils. Using PWM control an applied voltage e is switched across the motor windings. During the period when voltage is switched across the motor coils, the current rises in the motor coils at a rate dictated by their inductance and the applied voltage. The PWM voltage control is switched off before the current has increased beyond a required value, thereby allowing precise control of the phase current within the coil sub-sets to be achieved.

For a given coil set 60 the three phase bridge inverter 410 switches are arranged to apply a single voltage phase across each of the coil sub-sets.

Figure 6:
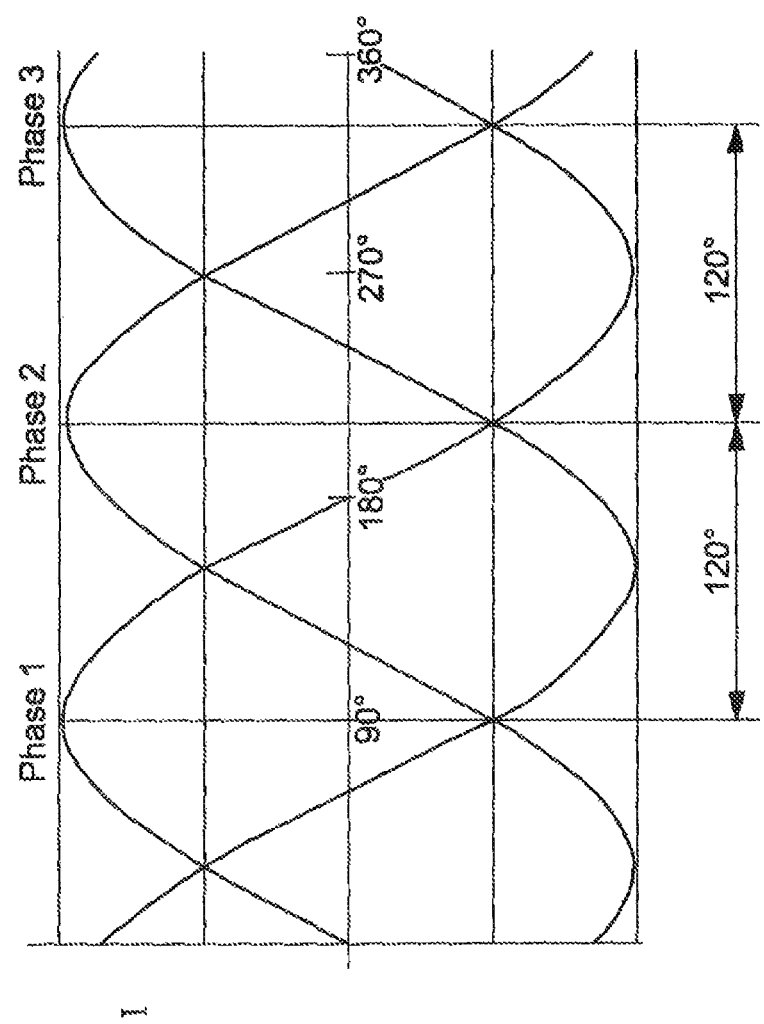
FIG. 6 illustrates phase currents in a three phase electric motor.

Using PWM switching, the plurality of switches are arranged to apply an alternating voltage across the respective coil sub-sets. The voltage envelope and phase angle of the electrical signals is determined by the modulating voltage pulses. FIG. 6 illustrates an example of phase currents in a coil set having three coil sub-sets, otherwise known as a three phase motor configuration, showing three phases.

The inverter switches can include semiconductor devices such as MOSFETs or IGBTs. In the present example, the switches comprise IGBTs. However, any suitable known switching circuit can be employed for controlling the current. For a three phase inverter having six switches configured to drive a three phase electric motor, the six switches are configured as three parallel sets of two switches, where each pair of switches is placed in series and form a leg of the three phase bridge circuit, with a fly-back diode, otherwise known as a reverse diode, coupled in anti-parallel across each switch. A single phase inverter will have two pairs of switches arranged in series to form two legs 600 of an inverter.

As stated above, each of the inverter legs 600 are electrically coupled between a pair of power source busbars.

As stated above, PWM switching is used to apply an alternating voltage to the electric c motors coil windings, where the rotor speed is dependent upon the amplitude of the voltage applied across the coil windings. The torque applied to the rotor results from phase current within the coil windings, where motor torque is proportional to the amplitude of the phase current. In other words:

$T \propto I_2$, where, $I_2$=rotor phase current amplitude,

A control system for preventing a hazard induced yaw condition occurring following a loss of communication between two drive sources arranged to provide drive to two transversely mounted wheels respectively for the vehicle illustrated in FIG. 1, while also allowing the electric motor drive system to provide a drive torque, will now be described. This provides the advantage of allowing a vehicle to continue operation despite a fault occurring with an electric motor or a communication link between two electric motors.

Under normal circumstances, for a vehicle drive system having transversely mounted wheels that are independent driven by separate drive sources, a hazard yaw condition is prevented by ensuring that the power differential between the power being applied to the transversely mounted wheels is below a threshold value. Empirical driver response studies indicate that power asymmetry values greater than 30 kW/tonne typically result in a hazardous induced yaw condition occurring that a driver of a vehicle may find difficult to control. Accordingly, in a preferred embodiment if the power differential between the power being applied to the first wheel and the second wheel is greater than 30 kW/tonne of vehicle weight, a controller is arranged to reduce the power differential. However, other power asymmetry threshold values may be used to indicate a hazard induced yaw condition.

As the derivation of power includes a speed term the power differential threshold value used for identifying a hazard induced yaw condition, for example 30 kW/tonne, is applicable across the vehicle's speed range and is not speed dependent. Accordingly, unlike torque asymmetry limits the same power differential threshold value can be used for identifying a hazard induced yaw condition irrespective of vehicle speed.

If, however, communication is lost with one of the electric motors, for example due to a fault with one of the electric motors or a fault with a communication link to an electric motor, the following described control system is arranged to prevent a hazard induced yaw condition occurring while also maintaining some level. of drive to one or more of the vehicles wheels.

To improve vehicle safety for a vehicle having independently driven transversely mounted wheels, control devices 400, incorporated within electric motors that are arranged to provide drive to the transversely mounted wheels, are arranged to communicate torque and/or power information being applied to a respective wheel of the vehicle to each other, thereby allowing the respective control devices to ensure that the power differential between transversely mounted wheels be maintained below a threshold value, as described above. The torque and/or power information is communicated to allow each respective control device determine the torque and/or power that is being applied to a transversely mounted wheel and consequently allow each control device within the respective electric motors to determine whether the power being applied to the transversely mounted wheels results in a power differential threshold being exceeded.

However, upon a control device 400, otherwise known as the first controller, incorporated within the electric motor arranged to provide drive to the first wheel failing to receive power or torque information generated by the electric motor arranged to provide torque to the second wheel, the first controller is arranged to estimate a plurality of possible power values for the power applied to the second wheel by the second electric motor. In particular, the first controller is arranged to estimate a first power value for the power applied to the second wheel by the second electric motor when the second electric motor is placed in a first motor configuration and estimate a second power value for the power applied to the second wheel by the second electric motor when the second electric motor is placed in a second motor configuration, thereby estimating possible power values for the power applied to the second wheel by the second electric motor for a plurality of different scenarios.

Upon the first controller estimating the plurality of different possible power values that could be applied by the second electric motor to the second wheel the first controller is arranged to determine a: first power differential between the power being applied to the first wheel by the first electric motor and the first estimated power value and a second power differential between the power being applied to the first wheel by the first electric motor and the second estimated power value. If the first controller determines that if either the first power differential or the second power differential is greater than a predetermined value the first controller is arranged to adjust the torque generated by the first electric motor to ensure that the maximum possible power differential would not result in yaw safety limits being exceeded. If the first controller determines that both the first power differential and the second power differential are less than a predetermined value the first controller is arranged to maintain the torque generated by the first electric motor Preferably, each control device within the respective in-wheel electric motors are arranged to determine the power, for example mechanical power, being applied to the respective wheel for which the respective in-wheel electric motor is acting as a drive source.

For the purposes of the present embodiment the respective control devices are arrange to determine mechanical power, however the power generated by the respective electric motors may be determined by any suitable means, for example electrical power.

Mechanical power is estimated using phase current measurements to estimate the torque generated by the respective in-wheel electric motors. The value of torque (T) is then combined with rotational velocity (w) of the respective rotors to provide an estimate of motor mechanical power, namely a product of torque and rotational velocity (T).

Figure 7:
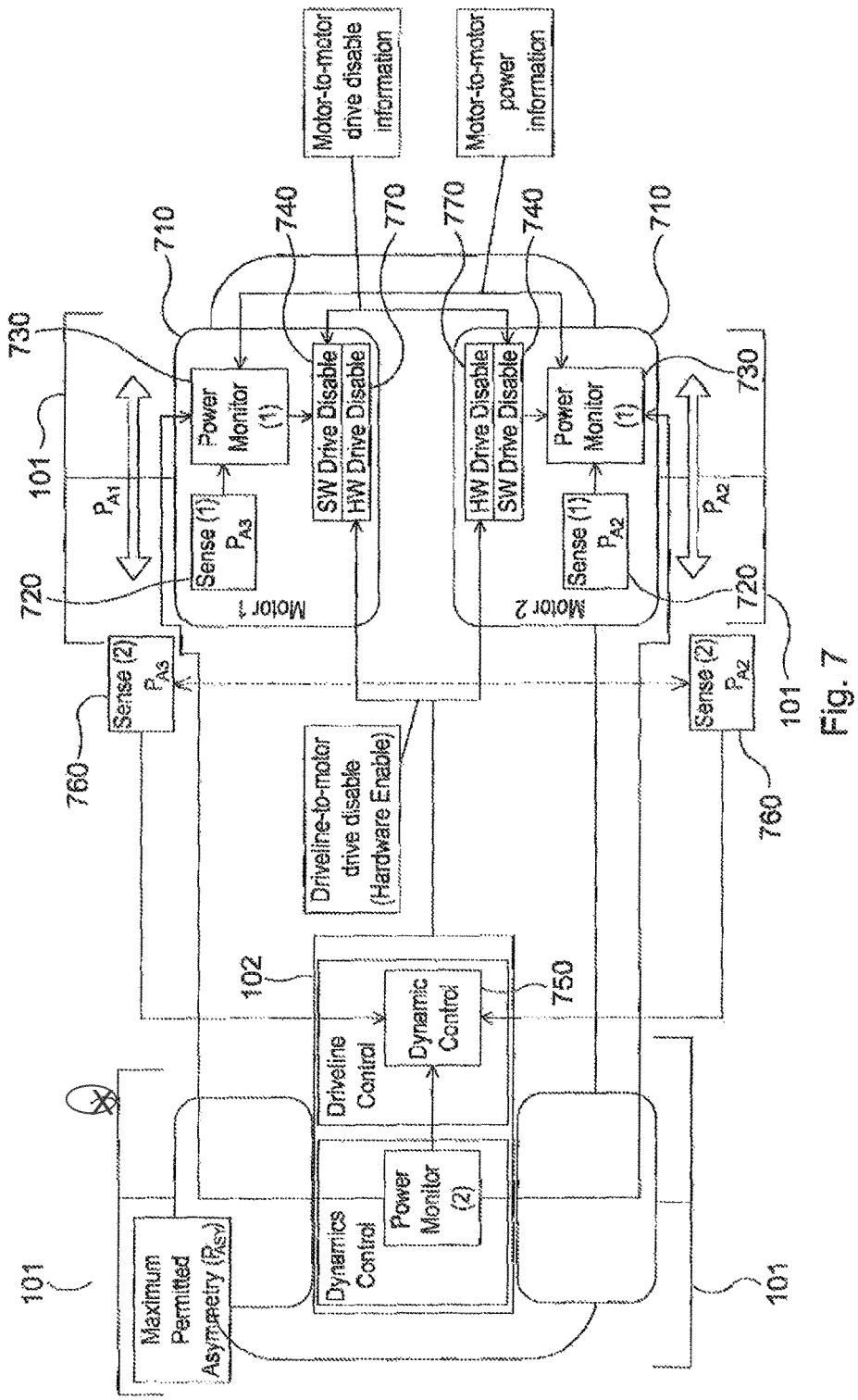
FIG. 7 illustrates a stability control system according to an embodiment of the present invention.

FIG. 7 illustrates a preferred embodiment of a control system for use in the vehicle illustrated in FIG. 1 for avoiding a yaw hazard condition occurring following a fault associated with one of the electric motors causing loss of communication between both electric motors.

The vehicle includes two in-wheel electric motors 710 that are arranged to drive the first wheel (i.e. the front near side wheel) and the second wheel (i.e. the front offside wheel) respectively with a main controller 102 arranged to provide torque values to each of the in-wheel electric motors 710 for providing a drive torque, where the torque values provided by the main controller 102 to the respective electric motors 710 are typically based on driver input, for example the position of a throttle pedal.

To support mechanical power estimation functionality, the control devices associated with both in-wheel electric motors include first sensing means 720, first power monitoring means 730 and a software drive disable function 740.

The first sensing means 720 is arranged to determine the mechanical power being developed by the respective in-wheel motor (PA) from motor phase current and speed, where each control device is arranged to communicate the determined mechanical power to the other electric motor.

Under normal circumstances, where each electric motor is receiving power information from the other electric motor, the first power monitoring means 730 associated with each in-wheel electric motor is arranged to compare the mechanical power being developed by its own motor (e.g. PA1) with that of the other motor (e.g. PA2), and sends a software disable request to the software drive disable function 740 should the asymmetric power exceed the predetermined threshold value PASY (for example, greater than 30 kW/tonne). Alternatively a torque reduction request, typically communicated via the main controller 102, may be issued to reduce the power differential between the two in-wheel electric motors. If, however, a dynamic control function within main controller 102 indicates that an advanced stability y control features (e.g. torque vectoring) has been selected requires power asymmetries of greater than the designated threshold value the above power differential threshold may be adjusted to a different value.

As such, if the dynamic control function identifies that the vehicle's stability control requires power asymmetries of greater than the designated threshold value to achieve required handling characteristics, the stability control system is arranged not to reduce the identified power asymmetry, for example the dynamic control function may over ride the software disable request or set a different power asymmetry threshold value.

The software drive disable function 740 within the motor is arranged to disable the motor drive PWM waveforms in response to receipt of a software disable request received from the first power monitoring means 730.

Additionally, the both in-wheel electric motors 710 include a hardware drive disable function 770.

The hardware drive disable function 770 is independent of the software disable function 740, where the motor will be disabled if either the hardware drive disable function 770 or the software disable function 740 is active However, in a situation where one of the electric motors fails to receive power information from the other electric motor, for example this may occur due a failure of the communication link between the two electric motors or as a result of a failure of one of the electric motors, a control device within the electric motor that fails to receive the power information is arranged to make a power value determination for the other electric motor. Due to the loss of communication from the other electric motor and without knowledge as to which motor configuration the other electric motor may have been placed in, for example if the other electric motor has experienced a fault it may be in one of a plurality of disabled modes, the electric motor is arranged to make a power value determination for the other electric motor for a plurality of different motor configurations. For example:

1) A motor configuration where the voltage supply to the other electric motor is disconnected. In this motor configuration the electric motor goes open circuit, where the traction voltage of the electric motor will increase with speed. However, the electric motor will not develop any drag.

2) A motor configuration where the coil windings for the other electric motor are shorted together, for example either the low or high side inverter switches are closed. In this configuration the drag torque is highest at lower rotational speeds.

3) A motor configuration where the coil windings of the other electric motors are placed in an open circuit configuration to allow current generated by the electric motor to flow onto a power source busbar arranged to provide the voltage supply to the electric motor.

Figure 8:
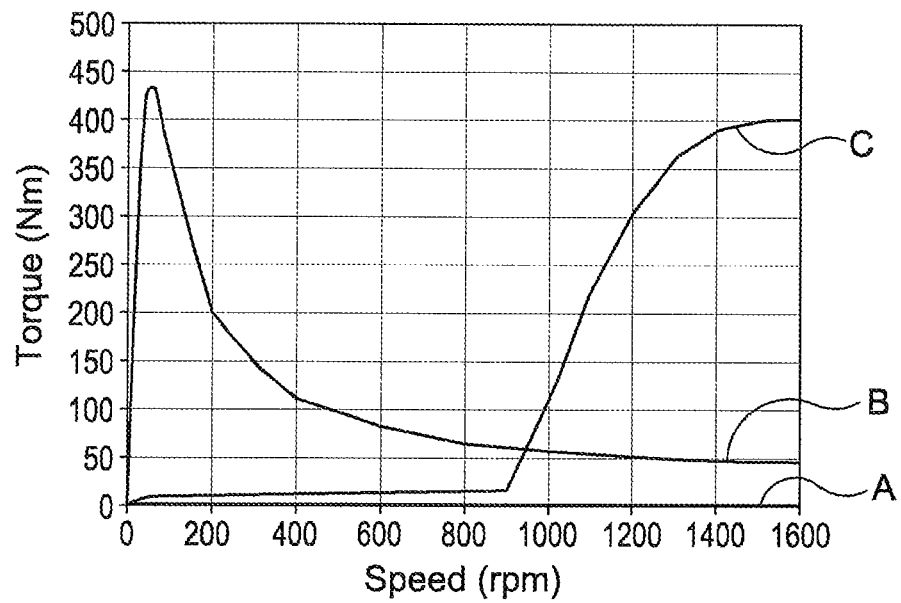
FIG. 8 illustrates drag torque for a plurality of motor configurations.
Figure 9:
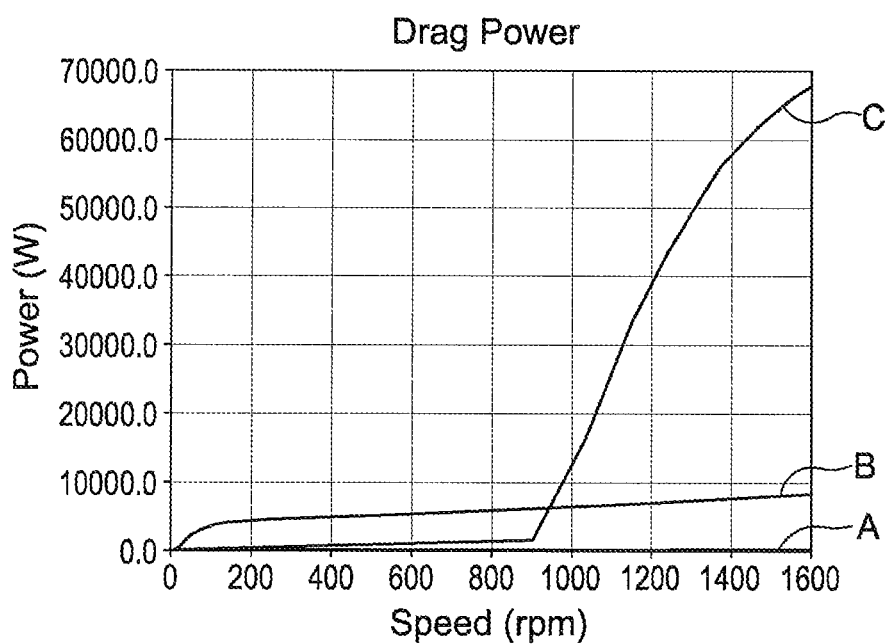
FIG. 9 illustrates drag power for a plurality of motor configurations.
Figure 10:
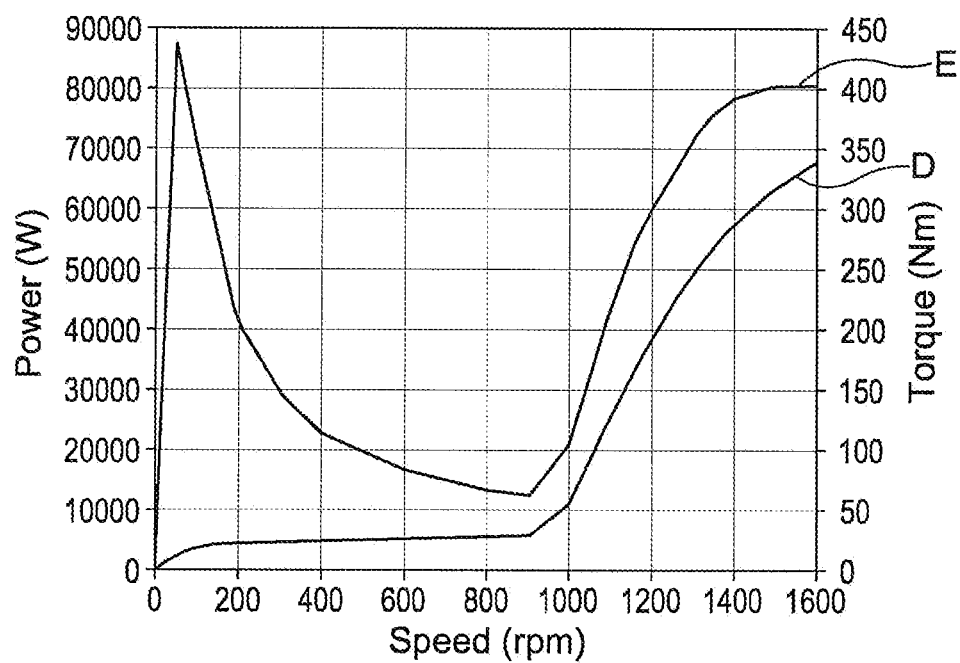
FIG. 10 illustrates drag power and drag torque uncertainty values for different motor configurations.

Illustrations of drag torques for these different motor configurations are shown in FIG. 8. As stated above the torque values can be converted to power by multiply them by speed, as illustrated in FIG. 9. For the purposes of both FIGS. 8 and 9, line A corresponds to the electric motor being disconnected, line B corresponds to the electric motor being in a short circuit configuration, line C corresponds to the electric motor being in an open circuit configuration. Based on these torque and power values, FIG. 10 illustrates the variations in possible torque and power values for the other electric motor, which corresponds to the maximum difference between any two lines in FIGS. 8 and 9, where line D corresponds to uncertainty in power and line E corresponds to uncertainty in torque.

Upon the electric motor determining power values for the other electric motor when in a plurality of different configurations, the electric motor compares the power it is generating against each of the different motor configurations the other electric motor may have been placed in. In other words, for the purposes of the present embodiment the electric motor is arranged to calculate the power differential assuming that the other motor is in a short circuit configuration, a disabled mode and in a free-wheeling mode. If either of these configurations were to result in the power differential exceeding 30 kW/tonne the electric motor would take action to reduce the power differential. For example, electric motor may notify the main controller 102 of the need to adjust the torque value being issued to the electric motor or the electric motor may initiate a safe state, where both electric motors are placed in a disabled state.

If, however, a determination is made that the power differential for all possible motor configurations that the other electric motor may be placed in would be below the yaw hazard condition threshold the electric motor can continue to operate under the control of the main controller 102 without any change in power, thereby allowing the vehicle to operate with potentially one of the electric motors being non-operational and without a yaw hazard condition occurring. Similarly, if a determination is made that the power differential for all possible motor configurations that the other electric motor may be placed in would be below the yaw hazard condition threshold, the main controller 102 may provide the electric motor that has lost communication with the other motor with any torque values that would not result in any of the different possible power differentials exceeding a yaw hazard condition threshold value.

The invention claimed is:

1. A control system for a vehicle having a first wheel arranged to be driven by a first electric motor and a second wheel arranged to be driven by a second electric motor, wherein the first wheel and the second wheel are transversely located on the vehicle relative to each other, the control system comprising:
a first controller associated with the first electric motor; and a second controller associated with the second electric motor, wherein:
the first controller includes:
means for estimating a first power value for the power applied to the second wheel by the second electric motor when the second electric motor is placed in a first motor configuration; and
means for estimating a second power value for the power applied to the second wheel by the second electric motor when the second electric motor is placed in a second motor configuration, wherein:
a first one of the first motor configuration and the second motor configuration corresponds to:
the second electric motor being disconnected from a voltage supply, or
coil windings of the second electric motor being placed in a short circuit configuration, or
coil windings of the second electric motor being placed in an open circuit configuration to allow current generated by the second electric motor to flow onto a power source busbar, and
a second one of the first motor configuration and the second motor configuration corresponds to:
the second electric motor being disconnected from a voltage supply, or
coil windings of the second electric motor being placed in a short circuit configuration, or
coil windings of the second electric motor being placed in an open circuit configuration to allow current generated by the second electric motor to flow onto a power source busbar,
the second one of the first motor configuration or the second motor configuration differing from the first one of the first motor configuration or the second motor configuration; and wherein:
upon the occurrence of a predetermined condition, the first controller is arranged to determine a first power differential between the power being applied to the first wheel by the first electric motor and the first power value and a second power differential between the power being applied to the first wheel by the first electric motor and the second power value, and
if the first controller determines that if either the first power differential or the second power differential is greater than a predetermined value the first controller is arranged to adjust the torque generated by the first electric motor or if both the first power differential and the second power differential are less than a predetermined value the first controller is arranged to maintain the torque generated by the first electric motor.

2. A control system according to claim 1, wherein if the first controller determines that either the first power differential or the second power differential is greater than a predetermined value then the first controller is arranged to adjust the torque generated by the first electric motor to reduce both the first power differential and the second power differential to less than the predetermined value.

3. A control system according to claim 1, wherein the predetermined condition corresponds to the first controller failing to receive torque information associated with the second electric motor.

4. A control system according to claim 1, wherein the predetermined condition corresponds to a fault occurring in a communication link between the first controller and the second controller.

5. A control system according to claim 1, wherein the predetermined condition corresponds to the first controller determining that a software disable command has been issued to the second controller.

6. A method for a vehicle having a first wheel arranged to be driven by a first electric motor and a second wheel arranged to be driven by a second electric motor, wherein the first wheel and the second wheel are transversely located on the vehicle relative to each other, the method comprising:
estimating by a first controller associated with the first electric motor a first power value for the power applied to the second wheel by the second electric motor when the second electric motor is placed in a first motor configuration; and
estimating by the first controller associated with the first electric motor a second power value for the power applied to the second wheel by the second electric motor when the second electric motor is placed in a second motor configuration, wherein:
a first one of the first motor configuration and the second motor configuration corresponds to:
the second electric motor being disconnected from a voltage supply, or
coil windings of the second electric motor being placed in a short circuit configuration, or
coil windings of the second electric motor being placed in an open circuit configuration to allow current generated by the second electric motor to flow onto a power source busbar, and
a second one of the first motor configuration and the second motor configuration corresponds to:
the second electric motor being disconnected from a voltage supply, or
coil windings of the second electric motor being placed in a short circuit configuration, or
coil windings of the second electric motor being placed in an open circuit configuration to allow current generated by the second electric motor to flow onto a power source busbar,
the second one of the first motor configuration or the second motor configuration differing from the first one of the first motor configuration or the second motor configuration; and wherein:
upon the occurrence of a predetermined condition determining a first power differential between the power being applied to the first wheel by the first electric motor and the first power value and a second power differential between the power being applied to the first wheel by the first electric motor and the second power value, and
if either the first power differential or the second power differential is greater than a predetermined value adjusting the torque generated by the first electric motor or if both the first power differential and the second power differential are less than a predetermined value the first controller is arranged to maintain the torque generated by the first electric motor.

7. A method according to claim 6, wherein if the first controller determines that either the first power differential or the second power differential is greater than a predetermined value then the first controller is arranged to adjust the torque generated by the first electric motor to reduce both the first power differential and the second power differential to less than the predetermined value.

8. A method according to claim 6, wherein the predetermined condition corresponds to the first controller failing to receive torque information associated with the second electric motor.

9. A method according to claim 6, wherein the predetermined condition corresponds to a fault occurring in a communication link between the first controller and the second controller.

10. A method according to claim 6, wherein the predetermined condition corresponds to the first controller determining that a software disable command has been issued to the second controller.

* * * * *